United States Patent

[11] 3,572,033

[72] Inventor Noel Partick Tolley
  Scarborough, Ontario, Canada
[21] Appl. No. 855,636
[22] Filed Sept. 5, 1969
[45] Patented Mar. 23, 1971
[73] Assignee Dowty Equipment of Canada Limited
  Ajax, Ontario, Canada

[54] POWER TRANSMISSION APPARATUS
  11 Claims, 10 Drawing Figs.
[52] U.S. Cl. .................................................. 60/53,
  180/77, 74/471, 74/473
[51] Int. Cl. ...................................................... B60k 29/00,
  G05g 9/00
[50] Field of Search ........................................ 180/77H;
  60/53, 180 (Inquired); 74/471, 473

[56] References Cited
  UNITED STATES PATENTS
1,928,915 10/1933 Stout ............................ 180/77H
3,126,707 3/1964 Hann et al. ................... 60/53A
3,180,305 4/1965 Gower-Rempel ............ 180/77H
3,323,607 6/1967 Futamata ..................... 180/77HX FOREIGN PATENTS
820,682 8/1969 Canada ........................ 180/77H Primary Examiner—Edgar W. Geoghegan
Attorney—Maybee and Legris ABSTRACT: Power transmission apparatus for use in a vehicle, the apparatus comprising two coaxially disposed hydrostatic transmission units each of which consists of a variable displacement hydraulic pump and a fixed displacement hydraulic motor, fluid from the pump, the input shaft of which is driven by an engine, serving to operate the motor. The housings of the units are journaled for turning movement about the axis of rotation of the output shafts of the units and a coil compression spring arrangement is provided for applying to the housings a balancing torque which counterbalances the reaction torque on the housings during operation of the apparatus, this reaction torque causing turning of the housings of the units so that the angular orientation of the housings is dependent on the magnitude of the reaction torque. The variable displacement setting of the pump of each transmission unit is so dependent on the angular orientation of the housings, which are interconnected to prevent relative rotation therebetween, that variation in the reaction torque on the housings results in a corresponding variation in the output torque which can be supplied by the output shafts, with a corresponding variation, in the opposite sense, in the speed of rotation thereof. The setting of the coil compression spring arrangement is adjustable to vary the magnitude of the balancing torque applied to the housings, and a steering assembly is provided so to vary the variable displacement setting of the pumps as to cause differential rotation of the wheels on the opposite sides of the vehicle in which the apparatus is installed, with resultant turning of the vehicle.

INVENTOR.
NOEL PATRICK TOLLEY

BY Maybee & Legris
ATTORNEYS

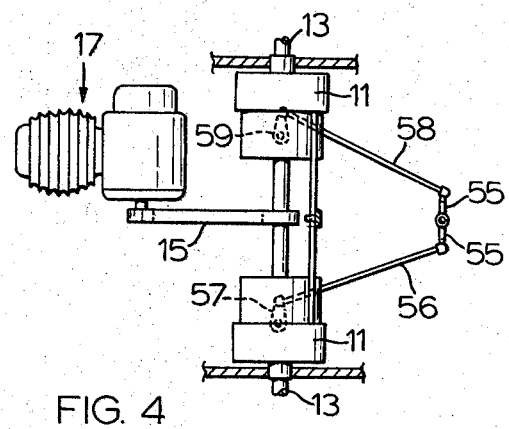
FIG. 4
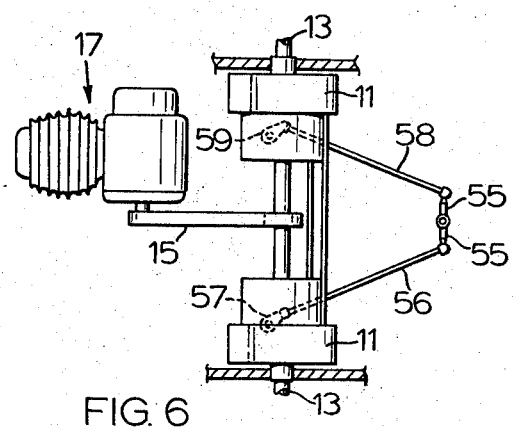
FIG. 6
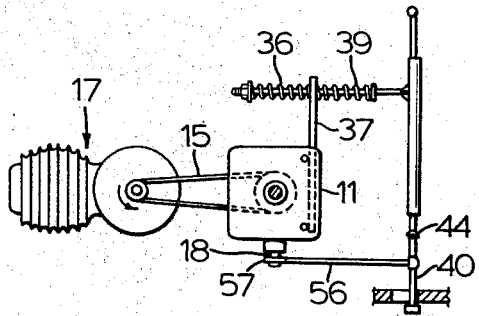
FIG. 5
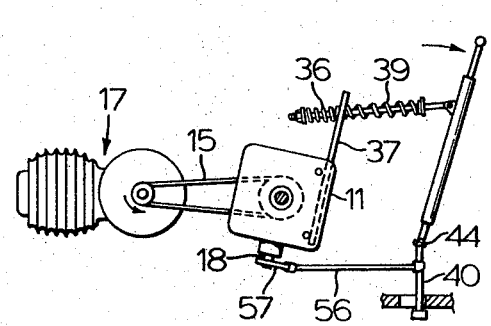
FIG. 7
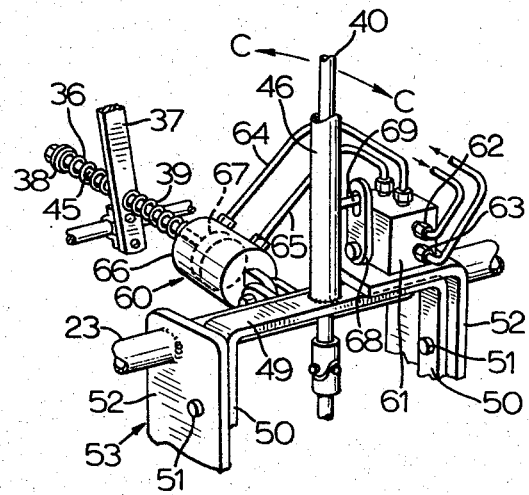
FIG. 2
FIG. 8
INVENTOR.
NOEL PATRICK TOLLEY
BY Maybee & Legris
ATTORNEYS

POWER TRANSMISSION APPARATUS

This invention is concerned with power transmission apparatus and more particularly, although not exclusively, with such apparatus which is intended to be used for driving the wheels or other traction means of a vehicle.

It is a primary object of this invention to provide such apparatus, in which the apparatus, when in use, is automatically controlled by a reaction torque dependent on the load on the output drive of the apparatus.

It has hitherto been proposed to provide hydraulic transmission apparatus in which the operation of the apparatus is controlled automatically, reference in this connection being made to the apparatus disclosed and claimed in U.S. Pat. Nos. 1,299,751 which issued on Apr. 8, 1919 to Magie, 2,931,176 which issued on Apr. 5, 1960 to Bloch et al., 2,971,498 which issued on Feb. 14, 1961 to Bloch, and 3,126,707 which issued on Mar. 31, 1964 to Hann et al., which represent the most relevant prior art of which the applicant is aware. The apparatus disclosed and claimed in each of these prior U.S. patents differs, however, from the apparatus according to the present invention in that, whereas the apparatus according to the prior patents is controlled by the pressure of the working fluid which is operatively supplied from the hydraulic pump to the hydraulic motor in the apparatus, the apparatus according to the present invention is, as indicated above, controlled directly by the reaction torque which acts on the apparatus and which is dependent on the load on the output drive of the apparatus.

Power transmission apparatus according to the present invention comprises at least one transmission unit including a housing, an input shaft which is adapted to be coupled to a prime mover for operative rotation relative to the housing, an output shaft which is operatively rotatable relative to the housing, and variable transmission control means coupling the input shaft with the output shaft to control the transmission of power therebetween. The housing of the transmission unit is journaled in a support structure for turning movement relative to the support structure and about the axis of rotation of the output shaft, means being provided for applying a balancing torque to the housing to counterbalance the reaction torque on the housing during rotation of the output shaft. The angular orientation of the housing relative to the support structure is dependent on the value of said reaction torque, this angular orientation so controlling the transmission control means that on variation in said angular orientation, resultant on an increase in the reaction torque, the setting of the transmission control means is varied to produce a corresponding increase in the output torque at the output shaft with a corresponding reduction in the speed of rotation thereof, and, conversely, that on variation in said angular orientation, resultant on a decrease in said reaction torque, the setting of the transmission control means is varied to produce a corresponding decrease in the output torque at the output shaft with a corresponding increase in the speed of rotation thereof.

In order that the invention may be more clearly understood and more readily carried into effect the same will now, by way of example, be more fully described with reference to the accompanying drawings in which:

FIG. 2 is an isometric view showing an alternative form of part of the apparatus illustrated in FIG. 1;

Figure 1:
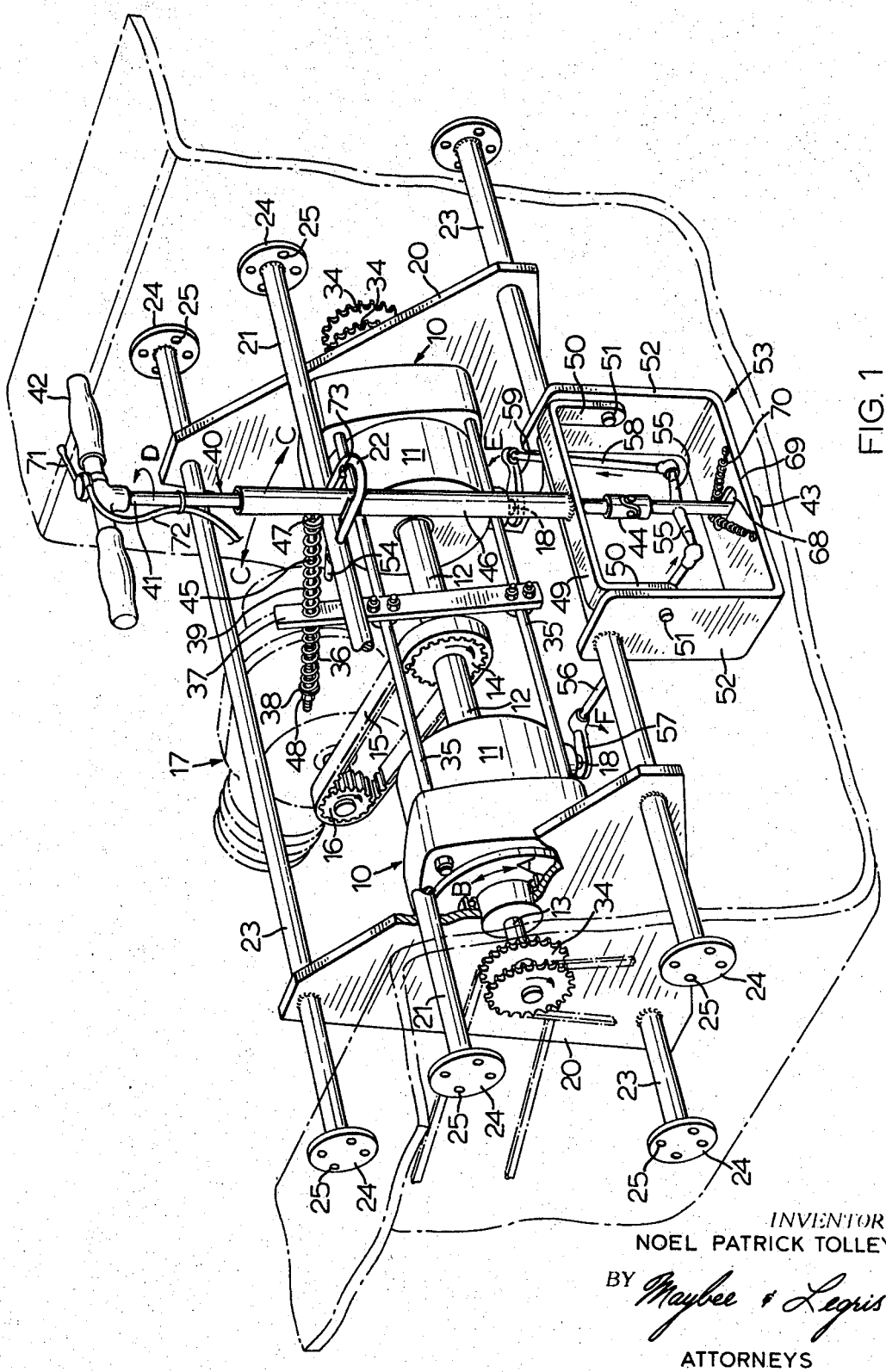
FIG. 1 is an isometric view of power transmission apparatus according to a preferred embodiment of the invention.
Figure 3:
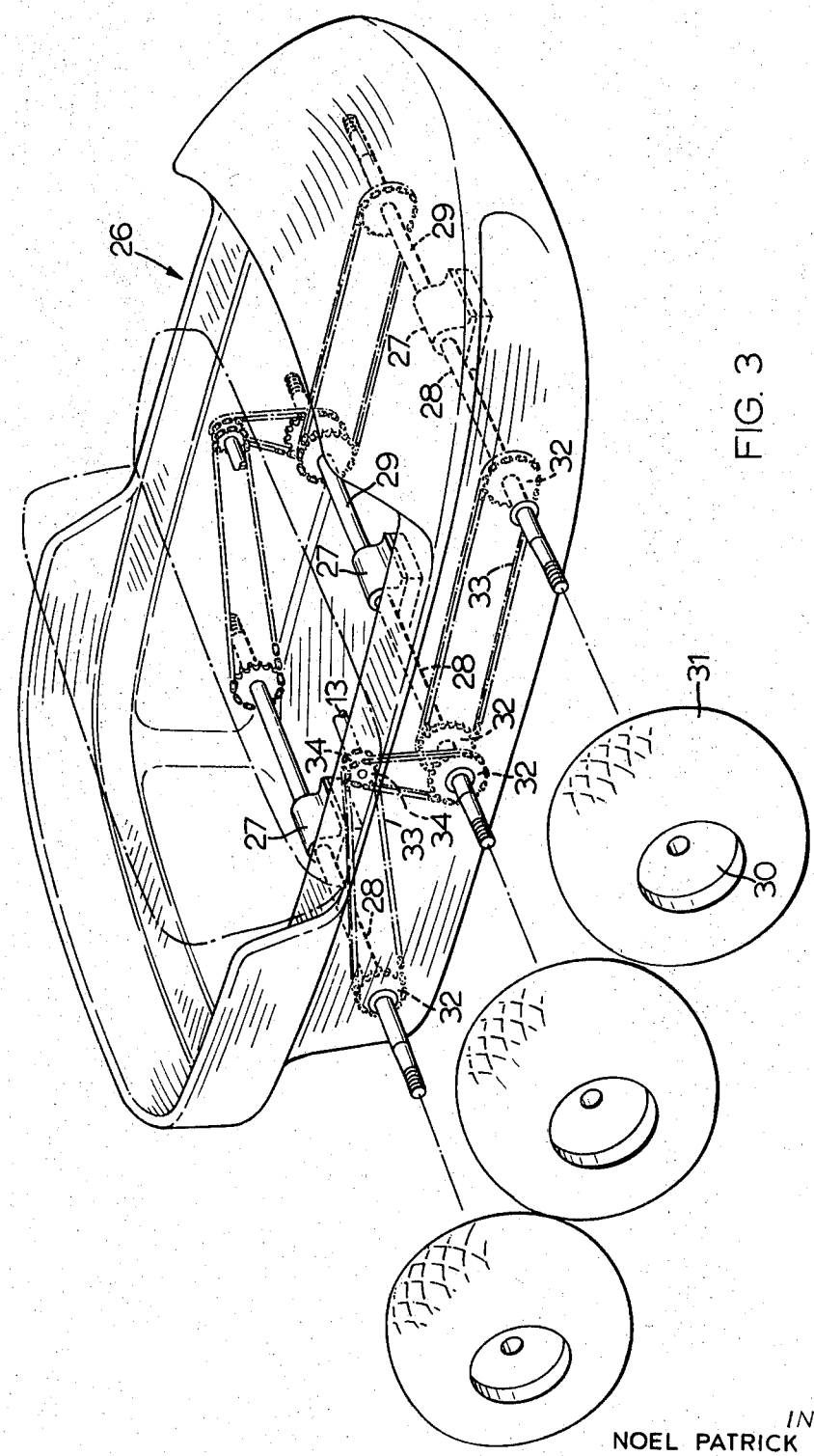
Figure 9:
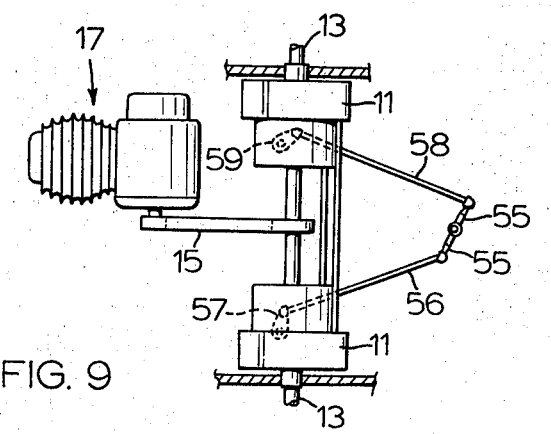
Figure 10:
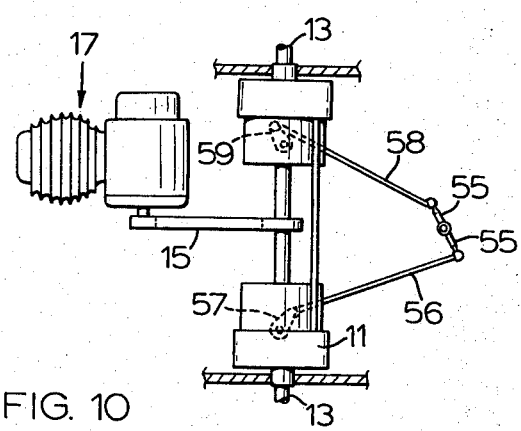

FIG. 3 is an isometric view showing one form of vehicle in which the apparatus illustrated in FIG. 1, or the alternative form of this apparatus illustrated in FIG. 2, may be mounted; and FIGS. 4 to 10, inclusive, are diagrammatic views showing the embodiment of the invention illustrated in FIG. 1 in various operative conditions, FIG. 4 being a top plan view showing the apparatus in the "neutral" condition, FIG. 5 being a side view showing the apparatus in the same condition as FIG. 4, FIG. 6 being a top plan view showing the apparatus in a "forward drive" condition, FIG. 7 being a side view showing the apparatus in the same condition as FIG. 6, FIG. 8 being a side view corresponding to FIG. 7 but showing the apparatus in a "reverse drive" condition, FIG. 9 being a top plan view showing the apparatus in a "right-hand turn, forward drive" condition, and FIG. 10 being a top plan view showing the apparatus in a "left-hand pivot turn" condition.

Throughout the drawings, like reference numerals are used to denote like parts.

With reference to the drawings, and in particular FIG. 1 thereof, 10 denotes generally each of two transmission units. The units 10 each include a housing 11, an input shaft 12, and an output shaft 13, the input and output shaft 12 and 13, respectively, of each unit 10 being, in the preferred embodiment illustrated, coaxially disposed relative to one another and relative to the corresponding shafts 12, 13 of the other unit 10 with the units 10 disposed in the relationship as shown, for example, in FIG. 1. The transmission units 10, may be of conventional form and may each be constituted by a hydrostatic transmission unit such as a hydrostatic transmission ball piston pump and motor assembly. Such assemblies are marketed by, for example, the Eaton Marshall Division of Eaton Yale and Towne Inc., of Marshall, Michigan, U.S.A. under the Trade Mark MARSHALLMATIC. It is to be understood, however, that the units 10 may be other than hydrostatic transmission units.

A pulley 14 is nonrotatably mounted on the input shafts 12 of the two units 10, this pulley 14 being operatively driven, thereby to rotate the shafts 12 relative to the housings 11, by means of a drive belt 15 which is entrained around the pulley 14 and around a further pulley 16 mounted on the output shaft of a prime mover, such as an internal combustion engine which may be of conventional form and which is shown in FIG. 1 in chain-dotted lines and denoted by the reference numeral 17. When the apparatus is in operation the rotation of the output shaft of the engine 17 is at all times unidirectional.

Each unit 10 also includes a variable transmission control means coupling the input shaft 12 with the output shaft 13 to control the transmission of power therebetween. Where the units 10 are each constituted by a hydrostatic transmission ball piston pump and motor assembly in which the input shaft 12 drives a variable displacement hydraulic pump the fluid from which operates a fixed displacement hydraulic motor thereby to produce rotation of the output shaft 13, the variable transmission control means includes the means for varying the displacement of said pump. In the embodiment of the invention illustrated in FIG. 1, this means for varying the displacement of the pump includes a rotatable control shaft 18.

The housing 11 of each unit 10 includes a trunnion which is journaled in a bearing presented by a support structure, denoted by the reference numeral 20, for turning movement of the housing 11 relative to the support structure 20 about the axis of rotation of the output shaft 13.

Each support structure 20 is in the form of a substantially triangular shaped plate, the corners of the plate 20 being rigidly connected to the corresponding corners of the other plate 20 by fixed structures constituted by tubes 23 which pass through, and are welded to, the plates 20 and the projecting ends of which are provided with annular flanges 24 in which holes 25 are formed.

Reference is now made to FIG. 3 of the drawings in which the reference numeral 26 denotes generally a vehicle body, the body 26 preferably being formed of integral, molded fiberglass construction, although it is to be understood that the form and manner of construction of this body 26 are in no way critical to the present invention. Secured to the base of the body 26 is a plurality of bearing members 27 within each of which is journaled an end portion of each of two coaxial drive shafts 28, 29, the shafts 28, 29 being freely rotatable independently of one another. The other end portion of each shaft 28, 29 passes through an opening formed in the appropriate sidewall of the body 26, a wheel 30 provided with an inflatable rubber tire 31 being nonrotatably mounted on said other end portion of each shaft 28, 29 in, for example, a conventional manner.

Mounted on the shafts 28, 29 within the body 26 are sprocket wheels 32 which are so connected by drive chains 33 to sprocket wheels 34 mounted on the output shafts 13 of the units 10 that, during operative rotation of the output shaft 13 of each unit 10, the shafts 28 or 29, and hence the wheels 30 mounted thereon, are driven in the same direction and at the same speed of rotation.

The power transmission apparatus illustrated in FIG. 1 is operatively mounted within the vehicle body 26 illustrated in FIG. 3, the transmission apparatus being secured to the body 26 by, for example, bolts (not shown) passing through the holes 25 in the annular flanges 24. The manner in which the transmission apparatus is mounted within the vehicle body 26 is indicated in FIG. 1, in which portions of the sidewalls and base of the body 26 are shown in chain-dotted lines. A tube 21 which is similar to the tubes 23 but which does not pass through the plates 20 is disposed between the sidewalls of the body 26, the ends of the tube 21 being provided with annular flanges 24 in which holes 25 are formed. The tube 21 is secured to the body 26 by, for example, bolts (not shown) which pass through the holes 25 in the annular flanges 24 of the tube 21.

It will be appreciated that, when the transmission apparatus is in operation with a load on the rotating output shaft 13 of each unit 10, a reaction torque tending to turn the housing 11 of each unit 10 about the axis of rotation of the output shafts 13 is applied to each housing 11, this reaction torque being dependent on the load on the output shaft 13, and also being dependent on the torque applied to the input shaft 12 by the engine 17.

The housings 11 of the units 10 are interconnected by rods 35 to prevent relative rotation between the housings 11 about the axis of rotation of the output shafts 13, means being provided for applying a balancing torque to the housings 11 to counterbalance the net reaction torque on the housings. In the preferred embodiment of the invention illustrated in FIG. 1, this means for applying a balancing torque comprises a coil compression spring 36, assuming that the direction of rotation of the output shafts 13 is as indicated by the arrow A, i.e., that the apparatus is in a "forward drive" condition. The spring 36 acts between a member 37 which is rigidly connected to the rods 35, and hence to the housings 11, and a stop 38 so that, during the above-mentioned rotation of the output shafts 13 in the direction of the arrow A, the turning of the housings 11, in the direction of the arrow B, caused by the reaction torque acting on the housings 11 in the direction of the arrow B, causes compression of the spring 36. This turning movement of the housings 11 continues until the torque exerted, in the direction of the arrow A, by the spring 36 compressed between the stop 38 and the member 37 balances said reaction torque on the housings 11. Thus the angular orientation of the housings 11, relative to the support structures 20, is dependent on the value of said reaction torque on the housings 11.

Preferably in each unit 10 the direction of rotation of the output shaft 13 is reversible by variation in the setting of the variable transmission control means. Thus, the reaction torque on the housing 11 may be in the direction of the arrow A and a second coil compression spring 39 is, accordingly, so disposed, in a manner similar to the spring 36, that, when compressed, it exerts through the member 37 and the rods 35 a balancing torque on the housings 11 in the direction of the arrow B.

A control member which is constituted by a control column 40 is connected to the stop 38, the column 40 being so moveable as to vary the magnitude of the torque exerted on the housings 11 by the spring 36, or by the spring 39. In the preferred embodiment illustrated, the column 40 has an upper end 41 presenting a handgrip portion 42 and a lower end 43. Intermediate the ends of the column 40 is incorporated a universal joint 44 about which the upper portion of the column 40, between the upper end 41 and the joint 44, may be pivotally moved in the directions of the arrows C-C thereby to produce the above-mentioned variation in the magnitude of the torque exerted on the housings 11 by the spring 36, or by the spring 39, the stop 38 being connected by a rod 45 to a nonrotatable sleeve 46 within which the upper portion of the column 40 is journaled. The rod 45 passes, as a clearance fit, through an opening formed in the member 37, the spring 36 being disposed around the portion of the rod 45 between the stop 38 and the member 37, and the spring 39 being similarly disposed around the portion of the rod 45 between the member 37 and the sleeve 46, to which the adjacent end of the rod 45 is pivotally connected about a horizontally disposed pin 47. The end of the rod 45 remote from the sleeve 46 has a nut 48 screw threadedly mounted thereon and bearing against the stop 38, the position of which along the length of the rod 45 is adjustable by rotation of the nut 48 relative to the rod 45 in the appropriate direction.

The lower end of the sleeve 46 is secured, as by welding, to a plate 49, the ends of which present downwardly projecting portions 50 which are pivotally connected by pins 51 to upwardly projecting side portions 52 of a substantially U-shaped bracket 53, the bracket 53 being supported on one of tubes 23 which passes through the side portions 52 of the bracket 53 and to which said side portions 52 are rigidly secured, as by welding. The axes of the pins 51 are collinear with one another and with the axis of the universal joint 44 so that by manually urging the handgrip portion 42 in the direction of one or other of the arrows C there is produced pivotal movement of the upper portion of the column 40 about the axis of the pins 51 with resultant variation in the magnitude of the torque exerted on the housings 11 by the spring 36, or by the spring 39.

A fixed stop 54 is provided, one end of the stop 54 being secured to the tube 21 and the other end thereof being contactable with the member 37 thereby to limit the maximum turning of the housings 11 in the direction of the arrow A, so that the maximum turning of the control shafts 18 is limited. A U-shaped bracket 22 is mounted with the ends thereof secured to the tube 21, the sleeve 46 being disposed between the limb portions of the bracket 22 and being contactable with the web portion of the bracket 22 when the upper portion of the column 40 is moved in the direction of the forward arrow C, thereby to limit the maximum compressive load which can be applied to the spring 36 by said movement of the upper portion of the column 40. The adjacent or inner faces of the limb portions of the bracket 22 are each provided with a spring steel strip 73, the sleeve 46 being resiliently held between the strips 73 to prevent any unintentional movement of the upper portion of the column 40 in the directions of the arrows C, but being slidable between the strips 73 during deliberate movement of the upper portion of the column 40 in these directions.

The lower portion of the column 40 between the universal joint 44 and the lower end 43 presents two opposed, projecting arms 55, one of which is connected by a linkage 56 to one end of a control arm 57 the other end of which is nonrotatably secured to the shaft 18 of the transmission control means of one of the units 10. The other arm 55 is connected by a second linkage 58 to one end of a control arm 59, the other end of which is nonrotatably secured to the shaft 18 of the transmission control means of the other of the units 10. The connections between the linkages 56, 58 and the arms 55, and between these linkages 56, 58 and the arms 57, 59, respectively, are preferably of the ball and socket type.

When, as hereinbefore described, the housings 11 are caused to turn about the axis of rotation of the output shafts 13 by the reaction torque acting thereon, there is produced, in addition to the variation in the compression of the spring 36, or the spring 39, to apply a balancing torque to the housings 11, a variation in the settings of the transmission control means of the units 10, this variation which results from the fact that, unless, as hereinafter more fully described, the handgrip portion 42 is turned to produce a steering action, there is no movement of the arms 55, being such as to cause an increase in the output torque at the output shafts 13 with a corresponding reduction in the speed of rotation thereof if there is an increase in the reaction torque on the housings 11, and being such as to cause a decrease in the output torque at the output shafts 13 with a corresponding increase in the speed of rotation thereof if there is a decrease in the reaction torque on the housings 11. Thus, the angular orientation of the housings 11 about the axis of rotation of the output shafts 13, this angular orientation being, as previously indicated, dependent on the value of the reaction torque acting on the housings 11, so controls the transmission control means of the units 10 that on variation in said angular orientation, resultant on an increase in the reaction torque on the housings 11 caused, for example, by the vehicle in which the transmission apparatus is installed encountering an incline, the settings of the transmission control means are varied by turning of the shafts 18 to produce a corresponding increase in the output torque at the output shafts 13 with the corresponding reduction in the speed of rotation thereof. Likewise, on variation in said angular orientation, resultant on a decrease in the reaction torque on the housings 11 caused, for example, by the vehicle encountering a decline, the settings of the transmission control means are varied by turning of the shafts 18 in the opposite direction to produce a corresponding decrease in the output torque at the output shafts 13 with the corresponding increase in the speed of rotation thereof.

FIG. 2 of the drawings shows an alternative form of a portion of the apparatus illustrated in FIG. 1. With reference to this FIG., a hydraulic power assist system is interpolated in the connection between the control column 40 and the stop 38, this system comprising a hydraulically operable piston and cylinder assembly 60, a valve 61 having an inlet 62 for the admission of pressurized fluid from a convenient source (not shown) thereof and an outlet 63 for exhaust fluid, and two hydraulic lines 64, 65 connected between the valve 61 and the cylinder 66 of the assembly 60. The assembly 60 comprises the cylinder 66 and a piston 67 which is moveable within the cylinder 66, the piston rod, which is constituted by the rod 45, passing through an opening in one end of the cylinder 66 in a fluidtight manner and the other end of the cylinder 66 being pivotally connected to the tube 23 to which the bracket 53 is fixedly secured. The hydraulic line 64 is in communication with the interior of the cylinder 66 on one side of the piston 67, and the hydraulic line 65 is in communication with the interior of the cylinder 66 on the opposite side of the piston 67. The valve 61 incorporates a control lever 68 which is so operable by a pin 69 presented by the sleeve 46 that on movement of the column 40 in the direction of one of the arrows C the net hydraulic pressure acting on the piston 67 is so varied as to vary, in the same manner as in the apparatus shown in FIG. 1, the magnitude of the torque exerted on the housings 11 by the spring 36, or by the spring 39.

The column 40, the arms 55, the linkages 56 and 58, and the arms 57 and 59 together constitute a steering assembly on actuation of which the setting of the transmission control means of one of the units 10 is so varied as to produce an algebraic reduction in the speed of rotation of the output shaft 13 of said one of the units 10, and simultaneously the setting of the transmission control means of the other of the units 10 is so varied as to produce a corresponding algebraic increase in the speed of rotation of the output shaft 13 of said other of the units 10. Thus, if the handgrip portion 42 is turned in the direction of the arrow D (FIG. 1) the control arm 59 is turned in the direction of the arrow E and the control arm 57 is turned in the direction of the arrow F. Assuming, for example, that this operation is performed while the apparatus is in a "forward drive" condition the above-mentioned movement of the arm 59 will result in a reduction in the speed of rotation of the output shaft 13 of the associated unit 10 while the above-mentioned movement of the arm 57 will result in an increase in the speed of rotation of the output shaft 13 of the associated unit 10, thereby causing the speed of rotation of the wheels 30 on the left-hand side of the vehicle to be reduced and the speed of rotation of the wheels 30 on the right-hand side of the vehicle to be increased with resultant turning of the vehicle to the left.

Conversely, if the handlegrip portion 42 is turned in the direction opposite to the direction of the arrow D the vehicle will turn to the right.

Since as previously stated, the direction of rotation of the output shafts 13 of the units 10 is reversible it will be clear that on turning of the handgrip portion 42 in the direction of the arrow D, or in the opposite direction, the direction of rotation of the output shaft 13 of one of the units 10 may be reversed and that the actual speed of rotation of this output shaft 13 may be increased by this turning of the handgrip portion 42. However, in algebraic terms, there will, of course, always be a reduction in the speed of rotation of the output shaft 13 of one of the units 10 and a corresponding increase in the speed of rotation of the output shaft 13 of the other of the units 10 when the handgrip portion 42 is turned to cause turning of the vehicle.

The lower end 43 of the column 40 passes through an elongated slot 68 formed in the web portion 69 of the bracket 53, this lower end 43 being moveable, by pivotal movement of the lower portion of the column 40 about the joint 44, towards and away from the transmission control means of the units 10 but being resiliently urged by a spring 70, the ends of which are secured to the web portion 69, into a predetermined position within the slot 68. Normally, the lower end 43 of the column 40 remains in this predetermined position, in which it is illustrated in FIG. 1, but if the housings 11 have such an angular orientation that further movement of the control arm 57 in the direction of the arrow F, or of the control arm 59 in the same direction, is not possible, it is clear that turning movement of the handgrip portion 42, for example to urge the control arm 57 in the direction of the arrow F and the control arm 59 in the direction of the arrow E, cannot result in such movement of the arm 57, in which case such turning movement of the handgrip portions 42 causes the lower end 43 of the column 40 to be urged along the slot 68 against the influence of the spring 70 with the resultant movement of the control arm 59 in the direction of the arrow E being greater than that which would otherwise occur. Thus, in this particular operative condition, turning of the vehicle is accomplished by a reduction in the speed of rotation of the output shaft 13 of one of the units 10 without any alteration in the speed of rotation of the output shaft 13 of the other of the units 10.

Numeral 71 denotes a manually operable throttle control which is mounted on the handgrip portion 42 and which is connected to the engine 17 by means, for example, of a Bowden cable 72 whereby to enable the fuel flow to the engine 17 to be varied as required.

With reference to FIGS. 4 and 5 of the drawings, the apparatus is therein shown in the "neutral" condition in which the control arms 57 and 59 are so disposed that the transmission control means of the units 10 are such that there is zero displacement of fluid from the variable displacement pump to the fixed displacement motor in each unit 10. The output shafts 13 are hydraulically locked when the apparatus is in this "neutral" condition.

FIGS. 6 and 7 show the apparatus when in a "forward drive" condition in which the spring 36 is compressed to exert on the housings 11 a balancing torque which counterbalances the reaction torque acting thereon.

FIG. 8 is a view corresponding to FIG. 7 but showing the apparatus in a "reverse drive" condition as will be readily understood.

FIG. 9 shows the apparatus when, with the apparatus in a "forward drive" condition, the handgrip portion 42 is then turned in the direction opposite to the direction of the arrow D in FIG. 1 to cause a right-hand turn of the vehicle without causing any reversal in the direction of rotation of either of the output shafts 13.

FIG. 10 shows the condition of the apparatus when, with the apparatus in the "neutral" condition illustrated in FIGS. 4 and 5, the handgrip portion 42 is then turned in the direction of the arrow D in FIG. 1 to cause the vehicle to execute a left-hand pivot turn. In this condition, the output shaft 13 of one of the units 10 rotates, of course, in one direction while the output shaft 13 of the other unit 10 rotates, as the same speed, but in the opposite direction, the vehicle thereby being caused to turn about a vertical axis passing through the center of the area bounded by the centers of the wheels 30. This feature is of particular importance if it is required to turn the vehicle within a confined space.

Preferably the shafts 28 and 29 pass through the sidewall of the vehicle in a fluidtight manner so that the vehicle, although primarily intended for land use may be used, for example, to ford rivers or lakes. In this case, the treads on the tires 31 function in the manner of paddles to propel the vehicle over the surface of the water.

While a preferred embodiment of the invention has hereinbefore been described with reference to the accompanying drawings, it is to be understood that various modifications may be incorporated therein without departing from the invention as defined in the accompanying claims. For example, although as described with reference to the accompanying drawings the transmission apparatus incorporates two transmission units 10 there may, in alternative embodiments, be only one such unit 10. In such alternative embodiments, however, it is of course not possible for a vehicle in which the apparatus is installed to be steered in the manner described above.

I claim:

1. Power transmission apparatus comprising a transmission unit including a housing, an input shaft which is adapted to be coupled to a prime mover for operative rotation relative to the housing, an output shaft which is operatively rotatable relative to the housing, and variable transmission control means coupling the input shaft with the output shaft to control the transmission of power therebetween, wherein the housing is journaled in a support structure for turning movement relative to the support structure about the axis of rotation of the output shaft, and means is provided for applying a balancing torque to the housing to counterbalance the reaction torque on the housing during rotation of the output shaft, the angular orientation of the housing relative to the support structure, which angular orientation is dependent on the value of said reaction torque, so controlling the transmission control means that on variation in said angular orientation, resultant on an increase in said reaction torque, the setting of the transmission control means is varied to produce a corresponding increase in the output torque at the output shaft with a corresponding reduction in the speed of rotation thereof, and that on variation in said angular orientation, resultant on a decrease in said reaction torque, the setting of the transmission control means is varied to produce a corresponding decrease in the output torque at the output shaft with a corresponding increase in the speed of rotation thereof.

2. Power transmission apparatus as claimed in claim 1, wherein the transmission unit comprises a hydrostatic transmission unit.

3. Power transmission apparatus as claimed in claim 1, wherein the transmission unit comprises a hydrostatic transmission ball piston pump and motor assembly.

4. Power transmission apparatus as claimed in claim 1, wherein the direction of rotation of the output shaft is reversible by variation in the setting of the variable transmission control means.

5. Power transmission apparatus as claimed in claim 1, wherein the means for applying a balancing torque to the housing comprises a coil compression spring, a member being rigidly connected to the housing with the spring acting between said member and a stop thereby to exert on the housing a balancing torque which is opposite in direction to the reaction torque on the housing.

6. Power transmission apparatus as claimed in claim 5, wherein a control member is connected to the stop, the control member being so movable as to vary the magnitude of the torque exerted on the housing by the spring.

7. Power transmission apparatus as claimed in claim 6, wherein a hydraulic power assist system is interpolated in the connection between the control member and the stop, the system comprising a hydraulically operable piston and cylinder assembly which is connected between the stop and a fixed structure, a valve having an inlet for pressurized fluid and an outlet for exhaust fluid, and two hydraulic lines connected between the valve and the cylinder with one of the lines in communication with the interior of the cylinder on one side of the piston and the other of the lines in communication with the interior of the cylinder on the other side of the piston, the valve being operable by movement of the control member to vary the net hydraulic pressure acting on the piston and hence vary the magnitude of the torque exerted on the housing by the spring.

8. Power transmission apparatus for use in a vehicle, the apparatus comprising two transmission units each of which includes a housing, an input shaft and an output shaft which are operatively rotatable relative to the housing, and variable transmission control means coupling the input shaft with the output shaft to control the transmission of power therebetween, the input shafts of the units being adapted to be coupled to a prime mover for operative rotation relative to the housings, wherein the housing of each unit is journaled in a support structure for turning movement relative to the support structure about the axis of rotation of the output shaft of the unit, the housings being interconnected to prevent relative rotation therebetween about said axes, and means is provided for applying a balancing torque to the housings to counterbalance the reaction torque on the housings during rotation of the output shafts, the angular orientation of the housings about the axis of rotation of the output shafts, which angular orientation is dependent on the value of said reaction torque, so controlling the transmission control means that variation in said angular orientation, resultant on an increase in said reaction torque, the settings of the transmission control means are varied to produce corresponding increases in the output torques at the output shafts with corresponding reductions in the speed of rotation thereof, and that on variation in said angular orientation, resultant on a decrease in said reaction torque, the settings of the transmission control means are varied to produce corresponding decreases in the output torques at the output shafts with corresponding increases in the speed of rotation thereof, and a steering assembly being so connected to the transmission control means of the two units that on actuation of said assembly the setting of the transmission control means of one of the units is varied to produce a reduction in the speed of rotation of the output shaft of said unit and simultaneously the setting of the transmission control means of the other of the units is varied to produce a corresponding increase in the speed of rotation of the output shaft of said other of the units.

9. Power transmission apparatus as claimed in claim 8, wherein each transmission unit comprises a hydrostatic transmission unit.

10. Power transmission apparatus for use in a vehicle, the apparatus comprising two transmission units each of which includes a housing, an input shaft and an output shaft which are operatively rotatable relative to the housing, and variable transmission control means coupling the input shaft with the output shaft to control the transmission of power therebetween, the input shafts of the units being adapted to be coupled to a prime mover for operative rotation relative to the housings, and the direction of rotation of the output shaft of each transmission unit being reversible by variation in the setting of the transmission control means of said unit, wherein the housing of each unit is journaled in a support structure for turning movement relative to the support structure about the axis of rotation of the output shaft of the unit, the housings being interconnected to prevent relative rotation therebetween about said axes, and means is provided for applying a balancing torque to the housings to counterbalance the reaction torque on the housings during rotation of the output shafts, the angular orientation of the housings about the axes of rotation of the output shafts, which angular orientation is dependent on the value of said reaction torque, so controlling the transmission control means that on variation in said angular orientation, resultant on an increase in said reaction torque, the settings of the transmission control means are varied to produce corresponding increases in the output torques at the output shafts with corresponding reductions in the speed of rotation thereof, and that on variation in said angular orientation, resultant on a decrease in said reaction torque, the settings of the transmission control means are varied to produce corresponding decreases in the output torques at the output shafts with corresponding increases in the speed of rotation thereof, and a steering assembly being so connected to the transmission control means of the two units that on actuation of said assembly the setting of the transmission control means of one of the units is varied to produce an algebraic reduction in the speed of rotation of the output shaft of said unit and simultaneously the setting of the transmission control means of the other of the units is varied to produce a corresponding algebraic increase in the speed of rotation of the output shaft of said other of the units.

11. Power transmission apparatus as claimed in claim 8, wherein the means for applying a balancing torque to the housings comprises a coil compression spring, a member being rigidly connected to the housings with the spring acting between said member and a stop thereby to exert on the housings a balancing torque which is opposite in direction to the reaction torque on the housings, and wherein there is provided a rotatable control column having an upper end presenting a handgrip portion and a lower end, the column intermediate its ends incorporating a universal joint about which the upper portion of the column between the upper end thereof and the universal joint may be pivotally moved thereby, the stop being connected to the upper end of the column, to vary the magnitude of the torque exerted on the housings by the spring, the lower portion of the column between the universal joint and the lower end thereof presenting opposed, projecting arms one of which is connected by a first linkage to the transmission control means of one of the transmission units and the other of which is connected by a second linkage to the transmission control means of the other of the transmission units, and said lower portion of the column being pivotally movable about the universal joint in a direction towards and away from the transmission control means of the transmission units but being resiliently urged towards a predetermined position.